United States Patent [19]

January

[11] 4,355,135

[45] Oct. 19, 1982

[54] TINTABLE ABRASION RESISTANT COATINGS

[75] Inventor: James R. January, Midland, Mich.

[73] Assignee: Dow Corning Corporation, Midland, Mich.

[21] Appl. No.: 318,240

[22] Filed: Nov. 4, 1981

[51] Int. Cl.$^3$ .................................................. C08K 3/20
[52] U.S. Cl. .............................. 524/767; 351/160 R; 351/160 H; 427/387; 524/765; 524/766; 524/379; 524/385; 524/730; 524/807; 524/811; 524/837; 528/14; 528/15; 528/19; 528/21; 528/23; 528/26; 528/28
[58] Field of Search .............. 524/767, 837, 765, 766, 524/807, 811, 730, 379, 385; 528/26, 28, 14, 15, 19, 21, 23; 427/387; 351/160 R, 160 H

[56] References Cited

U.S. PATENT DOCUMENTS

| | | | |
|---|---|---|---|
| 3,986,997 | 10/1976 | Clark | 524/767 |
| 4,073,967 | 2/1978 | Sandvig | 427/44 |
| 4,197,230 | 4/1980 | Baney et al. | 524/837 |
| 4,211,823 | 7/1980 | Suzuki et al. | 427/164 |
| 4,294,950 | 10/1981 | Kato | 528/26 |

Primary Examiner—Melvyn I. Marquis
Attorney, Agent, or Firm—Robert L. McKellar

[57] ABSTRACT

What is disclosed are hard, abrasion resistant, tintable/-dyeable coating compositions which are based on siloxane/silica hybrid coating resins. These materials are especially useful on transparent plastic substrates.

63 Claims, No Drawings

TINTABLE ABRASION RESISTANT COATINGS

BACKGROUND OF THE INVENTION

This invention deals with a siloxane composition used primarily for coating solid substrates. More specifically, the composition can be used to coat transparent solid substrates to render such substrates abrasion resistant and to allow such substrates to be tinted and/or dyed. The compositions of this invention when cured on solid substrates also give aesthetically pleasing, uniform, gel-free surfaces to the coated substrates.

Many solid substrates, especially clear, transparent plastic materials have been used as substitutes for glass in many applications. The reasons for this substitution are the unique properties of the plastics such as light-weightness, handleability, and ease of formation of articles.

Plastic materials are not without shortcomings, however, as most plastics are soft and scratch quite readily. In order to enable the use of plastics in some applications, it has been customary to coat the plastics with organic or silicone coatings. These coatings are, for apparent reasons, clear, unpigmented coatings. An example of such an organic coating is a heat curable polyurethane resin. The polyurethane resins are considered to be acceptable for coating plastic materials to render them abrasion resistant because eventhough the abrasion resistance of such polyurethane coatings is not as good as some siloxane-based coatings, the polyurethane coatings are less expensive.

In order to provide exceptionally hard abrasion resistant coatings to the plastic article manufacturers, new siloxane-based curable resin systems were developed. An example of such a resin system can be found in U.S. Pat. No. 3,986,997 issued Oct. 19, 1976. These siloxane resins are considered to be the premier coatings in the plastic lens and sheet market today. These coatings however have one major drawback. They do not allow tintability.

Many times, it is desirable for an end application of plastic materials if the abrasion resistant coatings can be tinted or dyed. Such uses for example include plastic sunglass lenses or bus and airplane windows.

Thus, it would be highly desirable if a method could be found to allow tintability of the premier resins, or a new resin system could be developed which would allow easy tintability of the coating and at the same time allow the coating to retain the excellent abrasion resistant properties found in siloxane-based coatings.

At least three siloxane-based resin systems have emerged in the prior art which attempt to give the desirable abrasion resistance and tintability properties. U.K. Patent Application No. 2,044,787A published Oct. 22, 1980 in the name of Ito Optical Industrial Co., Japan, discloses a coating composition containing at least one hydrolyzate of a silicon compound containing an epoxyfunctional group; a polycarboxylic acid or anhydride and a curing agent. These materials exhibit some inferior properties which will become clear when reference is made to them in the examples.

A second coating system is disclosed in U.S. Pat. No. 4,211,823 issued July 8, 1980 and assigned to Toray Industries, Inc., Tokyo, Japan. This system consists of a hydrolyzate of a silane compound which contains one epoxy group in the molecule; fine silica particles and an aluminum chelate compound. This material suffers from shelf instability, in that, the coating gels within several days after manufacture. A third coating system is a material disclosed in U.S. Pat. No. 4,073,967 issued Feb. 14, 1978 as a combination of a reactive silane and a metal ester. This material is tintable but does not offer the ultimate in abrasion resistance and handleability.

THE INVENTION

In order to overcome these inferior properties, a new curable composition has been discovered which when cured on a solid substrate gives coatings which are tintable, hard and abrasion resistant.

Such a composition comprises
(A) a base resin consisting of an aqueous-alcoholic dispersion of
  (i) 5 to 75 weight percent, based on the total solids of (A), of colloidal silica,
  (ii) 0 to 50 weight percent, based on the total solids of (A), of a partial condensate of a silanol which is selected from a group consisting of silanols having the formula
    (a) $RSi(OH)_3$ wherein R is methyl,
    (b) $R'Si(OH)_3$ wherein R' is a mixture of methyl radicals with radicals selected from the group consisting of vinyl, phenyl, ethyl, propyl, 3,3,3-trifluoropropyl, gamma-methacryloxypropyl, gamma-mercaptopropyl and gamma-chloropropyl wherein the ratio of methyl radicals to the other radicals in the mixture is at least 1:1, and
    (c) $R'Si(OH)_3$ wherein R" is selected from a group consisting of vinyl, phenyl, ethyl, propyl, 3,3,3-trifluoropropyl, gamma-methacryloxypropyl, gamma-mercaptopropyl and gamma-chloropropyl and mixtures thereof, wherein when (c) is selected, the amount of (c) in (A) cannot exceed 10 weight percent based on the total weight of (A);
  (iii) 10 to 55 weight percent, based on the total solids of (A), of a partial condensate of a silanol of the formula $R'''Si(OH)_3$ wherein R''' is selected from the group consisting of
    (a)

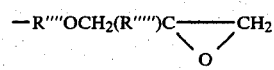

wherein R'''' is an alkylene radical containing 1 to 4 carbon atoms, R''''' is a hydrogen atom or an alkyl radical of 1 to 2 carbon atoms and
    (b)

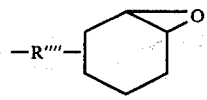

wherein R'''' has the meaning set forth above;
(B) a crosslinker for (A) and,
(C) a curing catalyst.

This invention also consists of a process for coating solid substrates with the inventive compositions herein which process consists of contacting a solid substrate with the inventive composition and thereafter curing the inventive composition on the substrate by heating the curable coating and the substrate to temperatures of 50° C. or higher.

A third aspect of this invention is a solid substrate whenever said substrate has been coated with a composition of this invention and cured.

The base resin (A) of the inventive compositions of this invention consists of three components: colloidal silica, a partial condensate of a silanol having the formula RSi(OH)$_3$, R'Si(OH)$_3$ or R"Si(OH)$_3$ and (iii), a partial condensate of a silanol of the formula R'''Si(OH)$_3$. The first component of the base resin, the colloidal silica, for purposes of this invention, refers to stable dispersions or sols of discrete particles of amorphous silica. This term excludes solutions of polysilicic acid in which the polymer molecules or particles are so small that they are not stable. Such solutions, which can be obtained by acidifying sodium silicate solutions or by hydrolyzing silicon esters or halides at ordinary temperatures can be used herein provided their viscosity is increased either by polymerization or aggregation such that the average particle size is 1 to 150 m$\mu$ in diameter. Preferred for this invention are commercial aqueous colloidal silica dispersions having a particle size in the range of 5-100 m$\mu$ in diameter. These silica dispersions are well-known commercial dispersions and are sold under such registered trademarks as "Ludox" and "Nalcoag". It is preferred to use colloidal silica of 10-30 m$\mu$ diameter particle size in order to obtain the greatest stability. This component is generally used at 5 to 75 weight percent based on the total solids of (A).

The second component of the base resin is the partial condensate of a silanol. This silanol can have the formula RSi(OH)$_3$ wherein R is the methyl radical or the silanol can have the formula R'Si(OH)$_3$ or the silanol can have the formula R"Si(OH)$_3$. When the silanol has the formula R'Si(OH)$_3$, R' is a mixture of the methyl radical and radicals selected from certain other radicals such as 3,3,3-trifluoropropyl, vinyl, phenyl, ethyl, propyl, gamma-methacryloxypropyl, gamma-mercaptopropyl, and gamma-chloropropyl radicals provided the ratio of methyl radicals to the other radicals in the mixture is at least 1:1. When the silanol has the formula R"Si(OH)$_3$, R" is selected from the radicals 3,3,3-trifluoropropyl, vinyl, phenyl, ethyl, propyl, gamma-methacryloxypropyl, gamma-mercaptopropyl, and gamma-chloropropyl provided that when (c) is selected, the amount of (c) in (A) cannot exceed 10 weight percent based on the total weight of (A). In the silanol R'Si(OH)$_3$, quantities of R' groups wherein R' is other than methyl, should not be greater than 50% of the R' groups in the silanols because coatings prepared from such materials are soft and less abrasion resistance. Preferably, less than 15 percent of R' groups other than methyl are used herein. Most preferably, less than 5 percent of such groups are used herein. This component is generally used at 0-50 weight percent based on total solids of (A).

The third component of the base resin (A) is a partial condensate of a silanol of the formula R'''Si(OH)$_3$ wherein R''' is selected from two groups consisting of (a), a radical having the formula

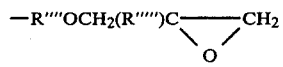

and (b) a radical having the formula

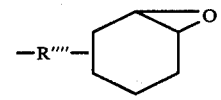

wherein R"" is an alkylene radical containing 1 to 4 carbon atoms and R""' is a hydrogen atom or an alkyl radical of 1 or 2 carbon atoms. It should be noted that the common feature of these two groups is the presence of the epoxy functionality in each. This component is generally used at 10–55 weight percent based on the total solids of (A).

For purposes of this invention, the preferred base resin (A) contains 5 to 75 weight percent of (A) (i); 5 to 50 weight percent of (A) (ii) and 10 to 45 weight percent of (A) (iii), all based on the total weight of A(i), (ii) and (iii) in the base resin. Most preferred for this invention is a base resin which contains 30 to 70 weight percent of A (i); 5 to 25 weight percent of (A) (ii) and 20 to 40 weight percent of (A) (iii).

As indicated earlier, the colloidal silicas used in this invention are aqueous sols and the inventive compositions are aqueous-alcoholic dispersions. The preparation of the base resin (A) is therefore carried out in an aqueous media and because of the nature of the starting materials, alcohols are necessarily part of the solvent system. The partial condensates set forth above as (A) (ii) and (A) (iii) are obtained from the condensation of RSi(OH)$_3$, R'Si(OH)$_3$, R"Si(OH)$_3$ and R'''Si(OH)$_3$ which in turn are obtained from the precursor trialkoxysilanes for example RSi(OCH$_3$)$_3$ and R'Si(OCH$_3$)$_3$. As will be described in detail in the examples, RSi(OH)$_3$, R'Si(OH)$_3$, R"Si(OH)$_3$ and R'''Si(OH)$_3$ are generated in-situ by adding the corresponding trialkoxysilanes to aqueous dispersions of colloidal silica. Suitable trialkoxysilanes are those containing methoxy, ethoxy, propoxy and butoxy substituents which upon hydrolysis in the aqueous medium, liberate the corresponding alcohols; thus, generating at least a portion of the alcohol present in the base resin. It should be understood that alcohol can be added to the hydrolysis medium prior to the addition of the alkoxysilanes and it should be understood that mixtures of alcohols can be used herein. Upon generation of the silanols in the aqueous medium, there is condensation of the hydroxyl groups to form siloxane bonds. Sometimes the hydrolysis and condensation reactions can be enhanced by the addition of small amounts of acids. The condensation does not go to completion but instead, there are a great number of hydroxyl groups on the siloxane. Optionally, it is sometimes desirable to utilize other water soluble or water-miscible solvents in this invention, such as, ketones, cellosolves and Dowanols. Dowanols are glycol monoethers and Dowanol EE is 2-ethoxy ethanol. These solvents are manufactured by The Dow Chemical Co., Midland, Mich., U.S.A. The base resin solution should contain 10 to 50 weight percent solids. Preferably, the base resin solution should contain from 15 to 40 weight percent solids depending on the end use of the final composition containing (A), (B), and (C).

The order of addition and hydrolysis of the components of the base resin are not critical but more favorable properties in the base resin solution and ultimately in the cured coating made from such a resin are enhanced when the alkoxy-silanes of components (A) (ii) and (A) (iii) are combined and added to the aqueous or aqueous-alcoholic silica sol at room temperature. The base resin (A) can be used immediately after preparation or it can be stored. Sometimes, the properties of the cured film can be optimized if the base resin is allowed to age. Aging can take place slowly at room temperature over several days or aging can be shortened by heating the base resin.

Examples of the trialkoxysilane precursors of component A (ii) (a), (b) and (c) are such silanes as

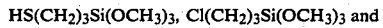

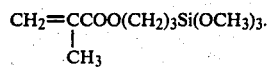

Examples of the trialkoxysilane precursors of component A (iii) are

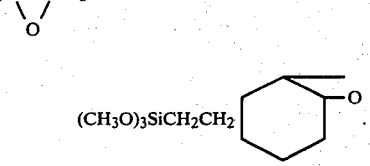

After the base resin is formed, it is treated with components (B) and (C) by simple mixing. The order of addition of components (B) and (C) to component (A) is not critical. It is important that components (B) and (C) are compatible with the base resin and further, it is important that components (B) and (C) are uniformly mixed in component (A). Non-uniformity of the mix or incompatibility of (B) or (C) in (A) causes non-uniform cured films containing blotches and/or opaque spots.

Component (B), the crosslinker, is selected from a group consisting of (i) polyfunctional carboxylic acids; (ii) polyfunctional anhydrides and (iii) polyfunctional imides. The amount of component (B) that is useful in this invention is based on the amount of component (A) (iii) used in the invention, that is, on the equivalents of epoxy contained in (A). Thus, for example, in the case of the polyfunctional acids, (B) (i), enough acid is added to the resin to react with 25 to 300% of the available epoxy groups in component (A). Preferred for this invention is an amount of (B) containing enough reactive acid, anhydride or imide to react with 25 to 200% of the epoxy groups in (A). These amounts are further limited by the solubility of component (B) in component (A). In those cases where the component (B) is completely insoluble in component (A), the cured film is not aesthetically pleasing and the tinting is irregular. In this invention, some of the component (B) materials are highly soluble in the base resin (A) and some are sparingly soluble in base resin (A). All such materials are considered within the scope of this invention, however, because even those materials used as component (B) that are sparingly soluble still lend valuable properties to the resins. As long as such materials are soluble in base resin (A) and as long as a curable, tintable hard film results, such materials are considered within the scope of this invention. Generally, component (B) is useful in this invention at 0.1 to 15 weight percent based on the weight of the entire composition (A), (B) and (C).

Examples of group (i) of component (B) are such compounds as itaconic, succinic, malonic, glutaric, adipic, pimelic, suberic, azelaic and sebacic acids and unsaturated dibasic acids such as fumeric and maleic. Examples of group (ii) of component (B) include such compounds as the cyclic anhydrides of the above mentioned dibasic acids such as succinic anhydride, glutaric anhydride, trimellitic anhydride, pyromellitic anhydride, phthalic anhydride and maleic anhydride. Examples of group (iii) of component (B) include such compounds as succinimide, phthalimide, glutarimide and maleimide.

The third component, (C), of this invention is a curing catalyst. For purposes of this invention, the catalyst can be selected from a group consisting of (i) metal acetylacetonates; (ii) diamides; (iii) imidazoles; (iv) amines; (v) organic sulfonic acids and their amine salts and (vi) alkali metal salts of carboxylic acids. Thus, examples of such catalysts include for group (i), such compounds as aluminum, zinc, iron and cobalt acetylacetonates; for group (ii), such compounds as dicyandiamide; for group (iii), such compounds as 2-methylimidazole, 2-ethyl-4-methylimidazole and 1-cyanoethyl-2-propylimidazole; for group (iv), such compounds as benzyldimethylamine, and 1,2-diaminocyclohexane; for group (v), such compounds as trifluoromethanesulfonic acid and for group (vi), such compounds as sodium acetate. For purposes of this invention, it has been found that from 0.05 to 5 weight percent based on the total solids in the composition, of the catalysts described herein will cause the composition to cure. Larger amounts of such catalysts do not appear to enhance the properties of the film and such large quantities constitute a waste of materials.

After the base resin is prepared, components (B) and (C) are added thereto and the composition is mixed to ensure that the composition is homogeneous. The composition in the catalyzed form is shelf stable and can be stored at room temperature for weeks.

When coating a substrate, the substrate is cleaned (described below) and then primed, if desired, and the coating is applied to the substrate. This can be accomplished by common coating methods such as dipcoating, spraying, brushing, spincoating, roller coating, flow coating or cascading. These various methods of coating allow the coating to be placed on the substrate at variable thicknesses thus allowing a wider range of use of the coating. Ordinarily, the coating of this invention performs best when the cured coating is in the range of 1 to 10 thick. Thicknesses in this range allow optimum tintability in shorter times at lower temperatures. The resins and substrate are normally heated to expedite the cure of the resin. Temperatures in the range of 50° C. to 150° C. can be used for most plastic substrates. One must only guard against overheating during cure and softening and distorting the plastic substrates. Therefore, a temperature of 80° C. to 130° C. is preferred. The inventive compositions have been found to be especially useful on plastic substrates such as polycarbonate, acrylic, CR-39 i.e. poly(diethylene glycol bis allyl) carbonate, polyesters, cellulose acetate butyrate, and acrylonitrile-butadiene-styrene.

Other additives can be added to the inventive compositions in order to enhance the usefulness of the coatings. For example, surfactants, ultraviolet absorbers, antioxidants, and the like, can be included herein.

The following examples serve to illustrate the invention and should not be construed as limiting the invention in any manner.

Testing Methods

Steel Wool Test

A two inch square of 0000 steel wool was applied over the face of a 24 oz. hammer and was secured with a rubber band. Coated lens blanks were tested for scratch resistance to 20 double rubs across the center of the lens with the weighted steel wool. The hammer is held by the end of its handle such that the majority of the pressure on the steel wool comes from the hammer head. The lens were graded according to the amount of scratching produced by the steel wool and hammer. The absence of scratches on the lens was graded a 1; slight scratching was graded a 2 and heavy scratching was graded a 3.

Adhesion Test

Adhesion of the coating to the lens was determined by scratching an "X" mark through the coating. Scotch brand "600" transparent tape was applied to the surface of the coating over the "X" and rubbed throughly. The tape was then pulled sharply off the surface at a 90° angle in one quick motion. This procedure was carried out three times and then the lenses were observed. The lenses were graded as either pass or fail or the percent adhesion is designated. Fail constituted any loss of coating whatsoever on any of the three pulls.

Tinting Test

The lenses were tinted using commercially available dyes from Brain Power, Inc., Miami, Fla., U.S.A. The lenses were tinted using BPI Sun Brown color. The tinting was carried out using an Economy Six Model dye system from BPI. The tinting was carried out at about 93° C. by immersing the lens in BPI Lens Preparation for one (1) minute at 90° C. and then into the dye bath for up to 30 minutes. In the tables of the examples, the time of lens immersion is indicated at 5 minutes (5 min.), 15 minutes (15 min.) and 30 minutes (30 min.).

The light transmission through the lens was measured using a Gardner Haze Meter, Model UX10, coupled to a P5500 photometric unit all manufactured by Gardner Laboratory, Inc., Bethesda, Md., U.S.A. and is reported as % transmission.

Abrasion Test (Tabor Test)

The abrasion resistance of the coating was tested on 4"×4"×⅛" polycarbonate and CR-39 panels. Abrasion tests were carried out on a Tabor Abrasor model 505 using a 500 gram load and 500 cycles. The abrasor is manufactured by Teledyne Tabor, North Tonawanda, NY, U.S.A. The measurement is the percent change in haze (%Δ Haze) between an abraded and unabraded panel. The measurements were made using the Gardner Haze Meter.

EXAMPLE 1

Preparation of a base resin.

At about 25° C., Nalcoag 1041 (a colloidal silica manufactured by Nalco Chemical, Oak Brook, Ill., U.S.A.), 1470 gm., and 44 gms. of acetic acid were mixed in a 1 liter, 3-necked flask which had been equipped with a mechanical stirrer, thermometer and an addition funnel. To the addition funnel there was added a mixture of 405 gms. of $(CH_3O)_3SiCH_3$ and 305 gms. of

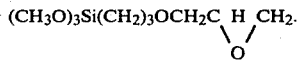

This silane mixture was added to the 1041 silica sol at a rapid rate. The time of addition was about 1½ hours. The resulting mixture was allowed to stir at about 25° C. for about 1 hour and then it was stripped to remove some methanol and water until there remained 1600 gms. of material in the flask. This material was diluted to 2500 gms. with a 1:1 weight ratio of a mixture of butanol and Dowanol EE. This material had a total solids content of 40%.

EXAMPLE 2

The base resin from above, 525 gms., was weighed into a quart glass jar and there was added 17.6 gms. of itaconic acid and 1.5 weight percent of aluminum acetylacetonate based on total solids and the mixture stirred for about 18–20 hours. There was then added 31.4 gms. of additional 1:1 weight ratio of butanol and Dowanol EE and mixed well. This material gives a 1:1 ratio of carboxylic acid to epoxy in the system. This material, when cured, on a CR-39 lens at 85° C. for 16 hours had some opacity and white flakes and therefore a new formulation was prepared in which the carboxylic acid to epoxy ratio was 0.85:1 which consisted of 92.6 gms. of the base resin from Example 1 added to the previous formulation along with 14.2 gms. of the 1:1 butanol/Dowanol EE. When thoroughly mixed, this composition was coated on CR-39 lenses and cured at 85° C. for 16 hours. The lenses when cooled were treated 15 minutes in a BPI Sun Brown dye bath at 90° C. to give a greenish-brown tint wherein the % transmission dropped from 90 to 50%.

EXAMPLE 3

The base resin from Example 1, 88.0 gms., was treated with 1.8 gms. of succinimide and mixed thoroughly. This material was divided into two equal samples and one sample designated "A" was further treated with 0.1 gms. of dicyandiamide and 35.0 gms. of Dowanol EE. The second sample designated "B" was treated with 0.1 gms. of aluminum acetyl acetonate and 30.0 gms. of Dowanol EE. Each sample composition was flow coated unto CR-39 lenses after the lens blanks were etched in 10% aqueous KOH. These coated lens were air dried about 10 minutes and then cured 16 hours at 85° C. The adhesion on both samples, before tinting, was 100% and the adhesion on both samples, after tinting, was 100%. The lens were treated in a dye bath at 93° C. for 30 minutes. The lens coated with sample "A" tinted to approximately 22% transmission. The lens coated with sample "B" tinted to a percent transmission of approximately 64 percent.

EXAMPLE 4

The base resin from example 1, 80 gms., was treated with 2.7 gms. of phthalic anhydride (equivalent weight was 74) and 56.1 gms. of 1:1 weight ratio butanol/Dowanol EE. This mixture was shaken to dissolve the anhydride in the base resin to form a coating composition. The homogeneous coating composition was then divided into two equal samples of 69.4 gms. each and designated "A" and "B". To "A", there was added 0.4 gms. of dicyandiamide. To "B", there was added 0.18 gms. of aluminum acetylacetonate. These samples were each stirred overnight (about 16–18 hours) to dissolve the catalysts. A third sample, designated "C" was prepared from 44.0 gms. of the base resin from Example 1, 0.9 gms. of succinic anhydride, 0.1 gms. of aluminum acetylacetonate and 31.0 gms. of 1:1 weight ratio of butanol and isopropanol. CR-39 lens were etched in 10% caustic, as above, and dried and then coated with each of the three coating samples. These coated lenses were then cured 10 minutes at 125° C. Results are shown in Table I. The lenses were then tinted in a BPI bath using BPI Sun Brown tint at 93° C. at the times shown in Table I.

TABLE I
Results from Example 4

| Sample | Adhesion Pretint | Adhesion Posttint | Abrasion Resistance | Tinting/% Transmission 5 Min. | 15 Min. | 30 Min. |
|---|---|---|---|---|---|---|
| A | Pass | Pass | 1 | 80 | 63 | 40 |
| B | Pass | Pass | 2 | 64 | 37 | 26 |
| C | Pass | Pass | 1 | 84 | 66 | 53 |

EXAMPLE 5

Several base resins with varing ratios of colloidal silica, methyltrimethoxysilane and

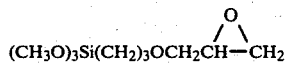

(epoxysilane) were prepared by placing Nalco 1041 colloidal silica and a small amount of acetic acid in a 3-necked, round-bottomed flask equipped as in Example 1. The silanes were mixed together and then added to the colloidal silica-acid mixture over a 20–30 minute period. After the addition was complete, the reaction mass was stirred for an additional 30 minutes and then diluted with butanol/isopropanol, (1:1 weight mixture) to 25% solids and then the reaction mass was stirred for an additional 15 minutes. After setting overnight, the resins were treated with a crosslinker and catalyst and coated unto CR-39 lenses. The lenses were then cured at 80° C. for 16 hours and then tinted in BPI Sun Brown dye at 93° C. Before coating, the lenses were etched in 10% caustic, washed and dried. The lenses were also tested for adhesion and abrasion resistance. The results are set forth in Table IV. The sample designation in Table III are for the coating composition prepared from the same letter designation of the formula on Table II, for example, coating composition AA was prepared from sample A resin formulation. This designation system prevails throughout the examples. Further, samples of coated lenses and/or panels will be designated as being prepared from the same letter formulation, for example, AAA on Table IV was prepared from the coating composition AA on Table III.

TABLE II
Composition of the Base Resins Prepared in Example 5

| Sample | Acetic Acid/gms. | Component X Colloidal Silica/gms. | Component Y CH$_3$Si(OCH$_3$)$_3$/gms. | Component Z Epoxysilane/gms. | Ratio X:Y:Z |
|---|---|---|---|---|---|
| A | 4.2 | 88.2 | 70.7 | 49.5 | 30:35:35 |
| B | 4.4 | 117.7 | 60.6 | 42.2 | 40:30:30 |
| C | 4.9 | 176.5 | 40.4 | 28.3 | 60:20:20 |
| D | 5.1 | 205.9 | 30.3 | 21.2 | 70:15:15 |
| E | 4.8 | 147.1 | 70.7 | 21.1 | 50:35:15 |
| F | 4.3 | 88.2 | 99.0 | 29.7 | 30:49:21 |
| G | 0.0 | 161.8 | 33.2 | 43.4 | 55:21.5:23.5 |

TABLE III
Coating Compositions Containing Crosslinker and Catalyst

| Sample | Crosslinker Succinimide/gms. | Catalyst Dicyandiamide/gms. | Base Resin/gms. |
|---|---|---|---|
| AA | 1.9 | 0.3 | 50 |
| BB | 1.6 | 0.3 | 50 |
| CC | 1.1 | 0.3 | 50 |
| DD | 0.8 | 0.3 | 50 |
| EE | 0.8 | 0.3 | 50 |
| FF | 1.1 | 0.3 | 50 |
| GG | 1.25 | 0.3 | 50 |

TABLE IV
Results of Testing on Lenses from Example 5

| Sample | % Adhesion | Steel Wool Abrasion | % Transmission 5 Min. | 15 Min. | 30 Min. |
|---|---|---|---|---|---|
| AAA | 100 | 1 | 73 | 55 | 24 |
| BBB | 100 | 1 | 91 | 66 | 45 |
| CCC | 100 | 1 | 90 | 83 | 70 |
| DDD | 100 | 1 | 92 | 78 | 66 |
| EEE | 100 | 1 | 92 | 90 | 88 |
| FFF | 100 | 1 | 87 | 83 | 75 |
| GGG | 100 | 1 | 88 | 76 | 66 |

EXAMPLE 6
A comparison of freshly prepared coating composition versus aged coating composition The coatings prepared in Example 5, which contained the crosslinker and catalyst as shown in Table III, were aged 5 days. Fifty gms. of freshly prepared coating composition containing a ratio of 55:23.5:21.5 of colloidal silica, CH$_3$SiO$_{3/2}$ and

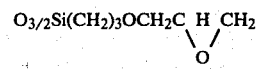

and 1.25 gms. of succinimide and 0.3 gms. of dicyandiamide was prepared in the same manner as in Example 5. This material was labeled Sample HH. As soon as the materials in Sample HH had been combined and mixed for 1½ hours, CR-39 lenses, which had been caustic etched, were coated with the above compositions and cured at 85° C. for 16 hours. The coated lenses were tinted at 93° C. in a BPI Sun Brown dye bath in the same manner as in Example 5. The coatings were tested for adhesion, steel wool abrasion resistance and tintability. The results can be found in Table V.

TABLE V

Results of Testing from Example 6

| Sample | % Adhesion | Steel Wool Abrasion | % Transmission 5 Min. | 15 Min. | 30 Min. |
|---|---|---|---|---|---|
| AAA | 100 | 1 | 73 | 55 | 25 |
| BBB | 100 | 1 | 83 | 74 | 46 |
| CCC | 100 | 1 | 92 | 90 | 80 |
| DDD | Sample Crazed | — | | | |
| EEE | 100 | 1 | 93 | 92 | 87 |
| FFF | 100 | 1 | 89 | 83 | 69 |
| GGG | 100 | 1 | 92 | 85 | 71 |
| HHH | 100 | 1 | 90 | 79 | 53 |

One can compare the samples GGG and HHH which have essentially the same composition formulations and conclude that both freshly prepared coating compositions and aged compositions give the same acceptable coatings. Aging did not impair the properties of the previously prepared samples since Table V, samples AAA through GGG, when compared with Table IV, Samples AAA through GGG, show essentially the same results on testing.

EXAMPLE 7

A 40 weight percent solids solution of the base resin from Example 1 of this specification is treated with a crosslinker and a catalyst as follows: Sample AA contains 39.9 gms. of the 40% base resin; 1.35 gms. of succinimide and 8.5 gms. of 1:1 weight ratio of butanol and isopropanol. Sample BB was formulated to contain 39.9 gms. of the 40% solution of base resin; 1.1 gms. of dicyandiamide and 8.8 gms. of 1:1 weight ratio of butanol and Dowanol EE. Two additional samples were also prepared. One contained a total weight of 15 weight percent succinimide (Sample CC) and the second contained a total weight of 15 weight percent dicyandiamide (Sample DD). Sample CC was prepared by adding 0.8 gms. of succinimide to 43.9 gms. of Sample AA and Sample DD was prepared by adding 0.7 gms. of dicyandiamide to 38.2 gms. of Sample BB. A fifth sample was prepared by adding 0.2 gms. of dicyandiamide to 30.4 gms. of Sample CC to give a sample containing 15 weight percent succinimide and 2.5 weight percent dicyandiamide. This material was designated EE. These compositions, AA through EE, were then coated on CR-39 lenses after the CR-39 lenses were etched with caustic, washed and dried. The compositions were also coated on 4"×4"×⅛" polycarbonate panels. The coated articles were heated to 85° C. for 16 hours to cure. They were then subjected to testing and the results can be found on Table VII while the general formulations can be found on Table VI.

TABLE VI

Formulations for Example 7 Coating Compositions

| Sample | Weight Percent Base Resin This Invention Example 1 | Weight % Succinimide | Weight % Dicyandiamide |
|---|---|---|---|
| AA* | 92.0 | 8.0 | |
| BB* | 92.0 | | 8.0 |
| CC* | 85 | 15 | |
| DD* | 85 | | 15 |
| EE | 82.5 | 15 | 2.5 |

*Outside scope of this invention.

TABLE VII

Results of Testing of Samples AA-EE of Example 7

| Sample | Substrate | % Adhesion | Steel Wool Abrasion | % Transmission 5 Min. | 15 Min. | 30 Min. | % Haze | Comments |
|---|---|---|---|---|---|---|---|---|
| AAA** | CR-39 | 100 | 3 | 20 | — | — | 15.0 | Clear |
| | *Lexan | 100 | | | | | | |
| BBB** | CR-39 | 100 | 1 | 85 | 60 | 40 | 8.0 | Spotty |
| | Lexan | 0 | | | | | | |
| CCC** | CR-39 | 100 | 3 | 20 | — | — | 45.0 | Hazy |
| | Lexan | 100 | | | | | | |
| DDD** | CR-39 | Very spotty and hazy - no testing done | | | | | | |
| | Lexan | | | | | | | |
| EEE | CR-39 | 100 | 1 | 75 | 50 | 30 | 5.7 | Clear |
| | Lexan | 100 | | | | | | |

*Lexan is a polycarbonate plastic and Lexan ® is a registered mark of the General Electric Co., U.S.A.
**Comparison examples.

Sample AAA failed the steel wool abrasion test and the Tabor Abrasor test in % Δ haze. Sample BBB failed adhesion on a polycarbonate substrate and the Tabor Abrasor test and in addition the coatings had visible spots in them. Sample CCC was too soft as can be observed from the steel wool and Tabor Abrasor test where the % Δ haze was 45. Sample DDD failed all tests. Sample EEE, the material of this invention passed every test and gave an abrasion resistant, tintable, hard coating.

EXAMPLE 8

Several coating compositions were prepared to illustrate succinimide as a crosslinker using the curing catalyst dicyandiamide. The compositions AA-GG were diluted to 25% solids with 1:1 weight ratio of butanol-/isopropanol before coating on caustic etched CR-39 lenses. Table VIII contains the formulations and Table IX shows the results of testing.

TABLE VIII

Formulations of Coating Compositions for Example 8

| Sample | Base Resin @ 40% Solids/Gms. | Gms. Succinimide | Weight % Succinimide | Weight % Dicyandiamide |
|---|---|---|---|---|
| AA | 50 | 0.6 | 5 | 1 |
| BB | 50 | 0.6 | 5 | 2.5 |
| CC | 29.25 | 1.3 | 10 | 3.5 |
| DD | 29.25 | 1.3 | 10 | 4.5 |
| EE | 29.25 | 1.3 | 10 | 2.5 |
| FF | 29.25 | 1.3 | 10 | 2.5 |
| GG | 50 | 2.5 | 20 | 4.0 |

TABLE IX

Results of Testing on Example 8 Formulations Wherein the Results are Reported in Order of Increasing Succinimide Quantities

| Sample | % Succinimide | % Adhesion | Steel Wool Abrasion | % Transmission 5 Min. | 15 Min. | 30 Min. | Comments |
|---|---|---|---|---|---|---|---|
| AAA | 5 | 100 | 1 | 80 | 60 | 25 | Good |
| BBB | 5 | 100 | 1 | 87 | 70 | 42 | Good |
| CCC | 10 | 100 | 1 | 70 | 40 | 15 | Good |
| DDD | 10 | 100 | 1 | 70 | 42 | 18 | Good |
| EEE | 10 | 100 | 1 | 70 | 50 | 18 | Good |
| FFF | 10 | 100 | 1 | 75 | 55 | 26 | Good |
| GGG | 20 | 100 | 1 | 75 | 55 | 20 | Good |

EXAMPLE 9

Example to investigate the effects of dicyandiamide concentration

A base resin prepared in a manner analogous to Example 1 of this application was prepared and diluted to 25% solids using butanol and isopropanol in a 1:1 weight ratio. This resin was used with varying amounts of dicyandiamide as the catalyst in a coating composition where the crosslinker was succinimide. Table X contains the formulations. The coating compositions were coated unto CR-39 lenses after the lenses had been etched in 10% caustic, washed and dried and cured at 85° C. for 16 hours. The lenses were then tested and the results can be found in Table XI.

TABLE X

Formulations from Example 9

| Sample | Base Resin Gms. | Weight Percent | Succinimide Gms. | Weight Percent | Dicyandiamide Gms. | Weight Percent |
|---|---|---|---|---|---|---|
| AA | 80 | 89.5 | 2.0 | 10 | 0.1 | 0.5 |
| BB | 40 | 89.0 | 1.0 | 10 | 0.1 | 1.0 |
| CC | 27 | 88.5 | 0.7 | 10 | 0.1 | 1.5 |
| DD | 40 | 88.0 | 1.0 | 10 | 0.2 | 2.0 |
| EE | 32 | 87.5 | 0.8 | 10 | 0.2 | 2.5 |

TABLE XI

Results of Testing of Example 9 Lenses

| Sample | % Adhesion | Steel Wool | 5 Min. | % Transmission 15 Min. | 30 Min. | Comments |
|---|---|---|---|---|---|---|
| AAA | 100 | 1 | 67 | 41 | 18 | Gray Color |
| BBB | 100 | 1 | 72 | 50 | 25 | Gray Color |
| CCC | 100 | 1 | 74 | 55 | 33 | Brown Color |
| DDD | 100 | 1 | 75 | 55 | 34 | Brown Color |
| EEE | 100 | 1 | 74 | 56 | 34 | Brown Color |

EXAMPLE 10

In a manner similar to Example 1, a 25% solution of base resin was prepared having a weight ratio of $$SiO_2:CH_3SiO_{3/2}:O_{3/2}Si(CH_2)_3OCH_2C\underset{O}{\overset{H}{\diagdown}\hspace{-0.3em}\underset{}{\diagup}}CH_2$$

of 55:23.5:21.5. This base resin was formulated as shown in Table XII. The formulated coating compositions were then coated unto CR-39 lenses and cured at 85° C. for 16 hours. The lenses were first etched in 10% caustic, washed and dried. The results are shown in Table XIII.

TABLE XII

Formulations from Example 10

| Sample | Base Resin/Gms. | Crosslinker/Gms. | | Catalyst/Gms. | |
|---|---|---|---|---|---|
| AA | 50 | Succinimide | 3.1 | Dicyandiamide | 0.3 |
| BB | 50 | Succinimide | 0.1 | Dicyandiamide | 0.3 |
| CC | 50 | Itaconic Acid | 1.0 | Dicyandiamide | 0.3 |
| DD | 50 | Succinimide | 1.25 | Dimethyl-benzylamine | 0.25 |
| EE | 50 | Pyromellitic Anhydride | 1.2 | Dicyandiamide | 1.2 |
| FF | 50 | Pyromellitic Anhydride | 1.2 | Dimethyl-benzylamine | 0.2 |

TABLE XIII

Results of Testing of Coated Lenses from Example 10 Formulations

| Sample | % Adhesion | Steel Wool | % Transmission 5 Min. | 15 Min. | 30 Min. |
|---|---|---|---|---|---|
| AAA | 100 | 1 | 89 | 76 | 48 |
| BBB | 100 | 1 | 90 | 85 | 69 |
| CCC | 100 | 1 | 90 | 83 | 68 |
| DDD | 100 | 1 | 83 | 66 | 38 |
| EEE | 100 | 1 | 83 | 73 | 40 |
| FFF | 100 | 1 | 74 | 53 | 20 |

EXAMPLE 11

Variability of the ratios of $SiO_2:R'SiO_{3/2}:R'''SiO_{3/2}$

The following base resins in isopropanol/butanol solvent were prepared by mixing the colloidal silica with a mixture of the $R'Si(OCH_3)_3$ and $R'''Si(OCH_3)_3$ silanes and then adding water and acetic acid in isopropanol/butanol solvent. The resins were mixed at ambient temperatures for 16 hours and diluted to 25% solids with 1:1 isopropanol/butanol, before use. The base resin formulations are shown in Table XIV. The coating composition formulations are shown on Table XV.

TABLE XIV

Base Resin Formulations from Example 11

| Sample | Ratio | Gms. $SiO_2$ | Gms. $CH_3Si(OCH_3)_3$ | Gms. 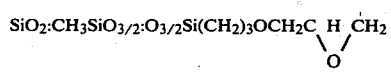 $(CH_3O)_3Si(CH_2)_3OCH_2C\overset{O}{\overset{/\diagdown}{H\;\;CH_2}}$ | Gms. $H_2O$ | Total Gms. Solvent |
|---|---|---|---|---|---|---|
| A | 15:42.5:42.5 | 43 | 87 | 60 | 53 | 157 |
| B | 50:40:10 | 143 | 82 | 14 | — | 161 |

TABLE XIV-continued
Base Resin Formulations from Example 11

| Sample | Ratio | Gms. SiO$_2$ | Gms. CH$_3$Si(OCH$_3$)$_3$ | Gms. (CH$_3$O)$_3$Si(CH$_2$)$_3$OCH$_2$CH—CH$_2$ (epoxy) | Gms. H$_2$O | Total Gms. Solvent |
|---|---|---|---|---|---|---|
| C | 50:30:20 | 143 | 61 | 8 | — | 168 |
| D | 50:20:30 | 143 | 41 | 42 | — | 174 |
| E | 50:10:40 | 143 | 20 | 56 | — | 181 |
| F* | 80:10:10 | 229 | 20 | 14 | — | 137 |

*80:10:10 falls outside the scope of this invention.

TABLE XV
Coating Compositions from Example 11

| Sample | Gms. Base Resin | Gms. Succinimide | Gms. Dicyandiamide |
|---|---|---|---|
| AA | 50 | 2.30 | 0.3 |
| BB | 50 | 0.54 | 0.3 |
| CC | 50 | 1.10 | 0.3 |
| DD | 50 | 1.60 | 0.3 |
| EE | 50 | 2.10 | 0.3 |
| FF | 50 | 0.54 | 0.3 |

The coating compositions were flow-coated unto CR-39 lenses which had been previously etched in 10% caustic, washed and dried, and cured at 85° C. for 16 hours and then tested. The results can be found in Table XVI.

TABLE XVI

| Sample | % Adhesion | Steel Wool | % Transmission 5 Min. | 15 Min. | 30 Min. |
|---|---|---|---|---|---|
| AAA | 100 | 1 | 82 | 53 | 20 |
| BBB | 100 | 1 | 97 | 91 | 87 |
| CCC | 100 | 1 | 96 | 93 | 83 |
| DDD | 100 | 1 | 75 | 47 | 13 |
| EEE | 100 | 1 | 56 | 33 | 11 |
| FFF | 0 | 1 | 40 | 18 | 3 |

In sample FFF, the coating cracked and flaked such that the adhesion test could not be carried out.

EXAMPLE 12

Effect of increasing epoxy content in coating compositions

Several coating resins were prepared in which the amount of epoxy group in the composition was varied from 30 weight percent to 80 weight percent. The base resins were prepared similar to Example 1 except that after all the base resin ingredients were mixed, they were stirred for about 45 minutes and allowed to stand three days before formulating into the coating compositions. The solvent used was 1:1 weight ratio of isopropanol/butanol. The resins were all 25% solids in solvent. The base resin formulations can be found in Table XVII.

The base resins were then formulated into coating compositions. The formulations for the coating compositions can be found in Table XVIII.

TABLE XVII
Base Resin Formulation for Example 12

| Sample | Ratio | Gms. SiO$_2$ | Gms. *R'Si(OCH$_3$)$_3$ | Gms. **R'''Si(OCH$_3$)$_3$ | H$_2$O Gms. | Solvent Gms. |
|---|---|---|---|---|---|---|
| A | 60:10:30 | 171 | 20 | 42 | 0 | 167 |
| B | 30:20:50 | 86 | 41 | 70 | 37 | 166 |
| C+ | 15:25:60 | 43 | 51 | 85 | 65 | 156 |
| D+ | 30:0:70 | 86 | 0 | 99 | 37 | 178 |
| E+ | 15:10:75 | 43 | 20 | 106 | 67 | 164 |
| F+ | 0:20:80 | 0 | 41 | 113 | 70 | 176 |

*R' = CH$_3$—
**R''' = CH$_2$—CHCH$_2$O(CH$_2$)$_3$— (epoxy)
+ = Outside the scope of the invention.

TABLE XVIII
Formulations of Coating Resins for Example 12

| Sample | % R'''SiO$_{3/2}$ | Gms. Base Resin | Gms. Succinimide | Gms. Dicyandiamide |
|---|---|---|---|---|
| AA | 30 | 50 | 1.6 | 0.3 |
| BB | 50 | 50 | 2.7 | 0.3 |
| CC | 60 | 50 | 3.2 | 0.3 |
| DD | 70 | 50 | 3.7 | 0.3 |
| EE | 75 | 50 | 4.0 | 0.3 |
| FF | 80 | 50 | 4.3 | 0.3 |

CR-39 lenses were caustic etched as indicated in previous examples, washed and dried and coated with the above coating compositions, air-dried for 15 minutes and then cured at 85° C. for 16 hours. The results of testing on these lenses are shown on Table XIX.

TABLE XIX
Results of Testing of Coated Lenses of Example 12

| Sample | % Adhesion | Steel Wool | % Transmission 5 Min. | 15 Min. | 30 Min. | Comments |
|---|---|---|---|---|---|---|
| AAA | 100 | 1 | 67 | 35 | 5 | Good Coating |
| BBB | 100 | 1–2 | 52 | 34 | 13 | Slight Wetting Problem |
| CCC | 100 | 2–3 | 16 | 10 | 1 | Poor Wetting |
| DDD | 100 | 3 | 31 | 20 | 6 | Poor Wetting |
| EEE | 100 | 3 | 26 | 17 | 4 | Poor Wetting Crystals Formed |
| FFF | 100 | 3 | 29 | 19 | 6 | Crystals |

EXAMPLE 13

Preparation containing β-(3,4-epoxycyclohexyl)ethyltrimethoxysilane

A base resin was prepared which contained the β-(3,4-epoxycyclohexyl)ethyltrimethoxysilane hydrolysis product by combining 34.3 gms. of β-(3,4-epoxycyclohexyl)ethyltrimethoxysilane; 50.7 gms. of $CH_3Si(OCH_3)_3$; 147.1 gms. of Nalco 1041 colloidal silica and 2.0 gms. of acetic acid in a round-bottomed glass flask as used in Example 1. The reaction mass was stirred for 1 hour and then 160 gms. of 1:1 weight ratio of isopropanol and butanol was added and the reaction mass stirred for an additional 30 minutes. After standing a few hours, the base resin was combined with crosslinker and catalyst to obtain a coating composition. Thus, 1.4 gms. of succinimide and 0.35 gms. of dicyandiamide were added to 50 gms. of the base resin. The mixture was shaken for about one hour and left to stand for 24 hours before coating on CR-39 lenses which had been caustic etched, washed and dried. The coated lenses were cured at 85° C. for 16 hours. The lenses when tested showed 100% adhesion; steel wool abrasion of one and tintability of 87/77/57 at 5, 15, and 30 minute tinting times, respectively.

EXAMPLE 14

A base resin was prepared as in Example 11D. To 50 gms. of this resin was added 1.6 gms. of succinimide and 0.1 gms. of zinc acetylacetonate to prepare a coating resin. This coating was cured on caustic etched CR-39 lenses and cured at 85° C. for 16 hours. The lenses when tested showed 100% adhesion, a steel wool abrasion resistance of 2-3 and a tintability of 38/23/7 at 5 min./15 min./and 30 min., respectively. The coating was soft but highly tintable.

EXAMPLE 15

Examples were mixed $R'Si(OH)_3$ are used

In a manner similar to Example 1, several base resins were prepared from mixed silanes wherein there was always present some amount of $CH_3Si(OH)_3$. The formulations for the base resins can be found in Table XX. $R'''Si(OCH_3)_3$ is

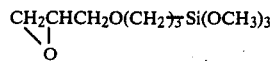

TABLE XX

| | | Formulations of Base Resins for Example 15 | | | |
|---|---|---|---|---|---|
| Sample | $SiO_2$/Gms. | $CH_3Si(OCH_3)_3$/Gms. | $R'''Si(OCH_3)_3$/Gms. | Additional $R'Si(OCH_3)_3$/Gms. | |
| A | 35.7 | 7.6 | 10.6 | $HS(CH_2)_3Si(OCH_3)_3$ | 1.9 |
| B | 35.7 | 5.1 | 10.6 | $CH_3(CH_2)_2Si(OCH_3)_3$ | 4.3 |
| C | 35.7 | 5.1 | 10.6 | $C_6H_5Si(OCH_3)_3$ | 3.8 |
| D | 35.7 | 5.1 | 10.6 | $CH_2=C(CH_3)COO(CH_2)_3Si(OCH_3)_3$ | 3.5 |
| E | 35.7 | 5.1 | 10.6 | $Cl(CH_2)_3Si(OCH_3)_3$ | 3.9 |

These base resins were diluted to 25% solids with 1:1 weight ratio butanol/isopropanol and were in turn combined with a crosslinker and catalyst to obtain a coating composition. Each coating composition therefore consisted of 50 gms. of base resin; 0.4 gms. of succinimide and 0.1 gms. dicyandiamide. Then coating compositions were then coated on CR-39 lenses which had been etched, washed and dried and were then cured at 85° C. for 16 hours. The results can be found in Table XXI.

TABLE XXI

| | Results of Coated Lenses Testing for Example 15 | | | | |
|---|---|---|---|---|---|
| | | Steel | | % Transmission | |
| Sample | % Adhesion | Wool | 5 Min. | 15 Min. | 30 Min. |
| AAA | 100 | 1 | 93 | 92 | 84 |
| BBB | 100 | 1 | 59 | 38 | 12 |
| CCC | 100 | 1 | 58 | 45 | 17 |
| DDD | 100 | 1 | 38 | 24 | 5 |
| EEE | 100 | 1 | 64 | 39 | 12 |

EXAMPLE 16

In a manner similar to Example 15, additional $R'Si(OH)_3$ mixed silanes were tested. Several base resins were prepared as in Example 1. The formulations for the base resins can be found in Table XXII. $R'''Si(OCH_3)_3$ is

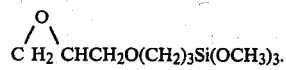

TABLE XXII

| | | Formulations for Base Resins for Example 16 | | | |
|---|---|---|---|---|---|
| Sample | $SiO_2$/gms. | $CH_3Si(OCH_3)_3$/gms. | $R'''Si(OCH_3)_3$/gms. | Additional $R'Si(OCH_3)_3$/gms. | |
| A | 36.8 | 9.1 | 10.6 | $CH_2=C(CH_3)COO(CH_2)_3Si(OCH_3)_3$ | 0.7 |
| B | 36.8 | 7.6 | 10.6 | $CH_2=C(CH_3)COO(CH_2)_3Si(OCH_3)_3$ | 1.7 |
| C | 36.8 | 9.1 | 10.6 | $C_6H_5Si(OCH_3)_3$ | 0.8 |
| D | 36.8 | 7.6 | 10.6 | $C_6H_5Si(OCH_3)_3$ | 2.0 |

The base resins were diluted with 1:1 weight ratio isopropanol/butanol to 25% solids and then shaken for three hours. The diluted resins, 50 gms. were then combined with 1.6 gms. succinimide and 0.3 gms. dicyandiamide and coated on CR-39 lenses. These coated lenses were cured at 85° C. for 16 hours. The lenses were tested and the results can be found on Table XXIII.

TABLE XXIII

| | Results of Tests on Coated Articles from Example 16 | | | | |
|---|---|---|---|---|---|
| | | Steel | | % Transmission | |
| Sample | % Adhesion | Wool | 5 Min. | 15 Min. | 30 Min. |
| AAA | 100 | 1 | 87 | 69 | 43 |
| BBB | 100 | 1 | 64 | 43 | 13 |
| CCC | 100 | 1 | 89 | 78 | 47 |
| DDD | 100 | 1 | 89 | 69 | 41 |

EXAMPLE 17

The base resin from Example 11D, 20 gms., was combined with 0.4 gms. of succinimide and 0.2 gms. of 10% aqueous sodium acetate and mixed for 2½ to 3 hours to form a coating composition; this composition was designated "AA". The coating composition was coated unto caustic etched CR-39 lenses and then cured at 85° C. for 16 hours.

The coating resin from above containing the sodium acetate, 16.4 gms., was combined with an additional 0.4 gms. of 10% aqueous sodium acetate and mixed for ½ hour. This material was coated on a CR-39 lenses and cured at 85° C. for 16 hours. This composition was designated "BB". This composition was then treated by combining 13.1 gms. of "BB" with an additional 0.4 gms. of 10% aqueous sodium acetate. This composition was designated "CC". This material was coated on a CR-39 lens and cured at 85° C. for 16 hours.

A third composition was prepared using 9.5 gms. of "CC" and 0.5 gms. of acetic acid. This material was designated "DD" and was coated on a CR-39 lens and cured at 85° C. for 16 hours. The results follow:

| Sample | % Adhesion | Steel Wool | % Transmission 5 Min. | 15 Min. | 30 Min. |
|---|---|---|---|---|---|
| AAA | 100 | 1 | 69 | 44 | 13 |
| BBB | 100 | 1 | 87 | 72 | 35 |
| CCC | 100 | 1 | 82 | 62 | 33 |
| DDD | 100 | 1 | 83 | 68 | 40 |

Polycarbonate panels were primed with an organofunctional silane and air dried about 15 minutes. The panels were Lexan, manufactured by the General Electric Co., Plastics Division, Pittsfield, Mass., U.S.A. These panels were flow coated with coating composition AA to DD and cured at 85° C. for about 16 hours. The abrasion resistance was tested on each panel using the Tabor Abrasor described above. AAAA through DDDD are the polycarbonate panels coated with the formulations AA through DD, and cured. The results follow:

| Sample | % ΔHaze | Comments |
|---|---|---|
| AAAA | 12.1 | Good Coating |
| BBBB | 4.3 | Good Coating |
| CCCC | 3.8 | Good Coating |
| DDDD | 4.2 | Slight Craze at Bottom of Lens After 30 Min. Dye Bath |

These materials were hard, abrasion resistant coatings having excellent tintability.

EXAMPLE 18

Following Example 1 of U.K. Patent Application No. 2,044,787A, a coating composition was prepared using 200 gms. of

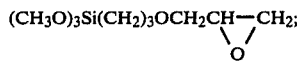

46 ml of 0.12 NHCl; 40 gms. methanol and 160 gms. of methylethylketone. To 100 gms. of this material was added 2.05 gms. of trimellitic anhydride and it was mixed for two hours and then 2.3 gms. of cobalt acetylacetonate was added with mixing. This coating composition was designated "AA" and it was flow coated onto CR-39 lenses and also onto CR-39 panels, which were 4"×4" squares, ⅛" thick, and cured 16 hours at 80° C.

Two coating compositions were prepared according to this invention by preparing a base resin by a method similar to that found in Example 1 of this specification wherein the ratio of $SiO_2/R'SiO_{3/2}/R'''SiO_{3/2}$ was about 50:20:30 and wherein $R'''SiO_{3/2}$ was

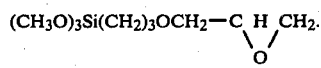

These base resins were diluted to about 30% solids using 1:1 weight ratio butanol/Dowanol EE and to 100 gms. of the first base resin there was added 2.2 gms. of itaconic acid and 0.5 gms. of aluminum acetyl acetonate this was designated "BB". To 100 gms. of the second base resin, there was added 2.2 gms. of itaconic acid and 0.5 gms. of cobalt acetyl acetonate this was designated "CC". Thereafter, there was added 24.3 additional grams of solvent to formulations "BB" and "CC". These compositions were flow coated unto CR-39 lenses and cured at 80° C. for 16 hours. After cure, the lenses were tested and the results follow:

| Sample | % Adhesion | Steel Wool | % Transmission 0 Min. | 15 Min. |
|---|---|---|---|---|
| AAA | 100 | 3 | 89 | 2.5 |
| BBB | 100 | 1 | 94 | 66 |
| CCC | 100 | 1 | 93 | 22 |

Coating compositions BB and CC were shelved for 1 month and then were coated on CR-39 lenses and cured at 85° C. for 16 hours. Samples BBBB and CCCC are coated with formulations BB and CC after aging the formulations for one month. The results on testing the cured lenses follows:

| Sample | % Adhesion | % Transmission 1 Min. | 3.5 Min. | 8.5 Min. | 15 Min. | 30 Min. |
|---|---|---|---|---|---|---|
| BBBB | 100 | 83 | 72 | 56 | 38 | 18 |
| CCCC | 100 | 59 | 35 | 18 | 9 | 3 |

Aging the coating compositions for one month appears to enhance tintability of the cured coatings.

EXAMPLE 19

A base resin was prepared by the method set forth in Example 1. The resin had a ratio of $SiO_2/R'Si(OCH_3)_3/R'''Si(OCH_3)_3$ of 55:23.5:21.5 and was prepared using 1470 gms. of Nalco 1041 colloidal silica; 44 gms. acetic acid; 405 gms. $CH_3Si(OCH_3)_3$ and 305 gms. of

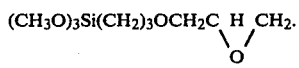

The base resin was diluted with 1:1 weight ratio of butanol/isopropanol to 25% solids. This base resin was used to prepare a series of coating compositions containing various crosslinkers and catalysts within the scope of this invention. The formulations are on Table XXIV. The compositions were flow coated on CR-39 lenses and cured at 85° C. for 16 hours. The results can be found on Table XXIV.

TABLE XXIV

| Sample | Gms. Base Resin | Crosslinker | /Gms. | Catalyst | /Gms. | % Adhesion | Steel Wool | % Transmission 5 Min. | 15 Min. | 30 Min. | Comments |
|---|---|---|---|---|---|---|---|---|---|---|---|
| AA | 100 | Succinic anhydride | 1.3 | Benzyldimethylamine | 0.50 | 100 | 1 | 88 | 71 | 43 | |
| BB | 100 | Succinic anhydride | 1.75 | Benzyldimethylamine | 0.50 | 100 | 1 | 86 | 72 | 44 | |
| CC | 100 | Succinic anhydride | 2.2 | Benzyldimethylamine | 0.50 | 100 | 1 | 84 | 66 | 36 | |
| DD | 100 | Itaconic acid | 1.7 | Benzyldimethylamine | 0.50 | 100 | 1 | 68 | 42 | 25 | |
| EE | 100 | Itaconic acid | 2.3 | Benzyldimethylamine | 0.50 | 100 | 1-2 | 28 | 16 | — | |
| FF | 100 | Itaconic acid | 2.9 | Benzyldimethylamine | 0.50 | 100 | — | — | — | — | Precipitated Spots |
| GG | 100 | Trimellitic anhydride | 1.7 | Benzyldimethylamine | 0.50 | 100 | 1 | 82 | 62 | 30 | |
| HH | 100 | Trimellitic anhydride | 2.2 | Benzyldimethylamine | 0.50 | 100 | 1 | 87 | 61 | 30 | |
| II | 100 | Trimellitic anhydride | 2.7 | Benzyldimethylamine | 0.50 | 100 | 1 | 83 | 64 | 28 | |
| JJ | 50 | Itaconic acid | 0.85 | Benzyldimethylamine | 0.26 | 100 | 1 | 73 | 50 | 18 | |
| KK | 50 | Itaconic acid | 0.85 | Dicyandiamide | 0.33 | 100 | 1 | 90 | 84 | 60 | |
| LL | 50 | Itaconic acid | 0.85 | Trifuloromethanesulfonic acid | 0.07 | 100 | 1 | 65 | 43 | 14 | |
| MM | 50 | Itaconic acid | 0.85 | FC-520* | 0.08 | 100 | 1 | 80 | 58 | 26 | |
| NN | 50 | Itaconic acid | 0.85 | 2-Methylimidazole | 0.26 | 100 | 1 | 85 | 75 | 48 | |
| OO | 100 | Itaconic acid | 0.57 | Benzyldimethylamine | 0.50 | 100 | 1 | 58 | 33 | 11 | |
| PP | 100 | Itaconic acid | 1.14 | Benzyldimethylamine | 0.50 | 100 | 1 | 45 | 25 | 6 | |
| QQ | 100 | Itaconic acid | 1.71 | Benzyldimethylamine | 0.50 | 100 | 1 | 53 | 33 | 12 | |
| RR | 100 | Phthalimide | 1.9 | Benzyldimethylamine | 0.50 | 100 | 1 | 89 | 77 | 59 | |
| SS | 100 | Phthalimide | 2.6 | Benzyldimethylamine | 0.50 | 100 | 1 | Insoluble | | | |
| TT | 100 | Phthalimide | 3.3 | Benzyldimethylamine | 0.50 | 100 | 1 | Insoluble | | | |
| UU | 100 | Pyromellitic acid anhydride | 1.4 | Benzyldimethylamine | 0.50 | 100 | 1 | 75 | 48 | 18 | |
| VV | 100 | Pyromellitic acid anhydride | 1.9 | Benzyldimethylamine | 0.50 | 100 | 1 | 78 | 64 | 24 | |
| WW | 100 | Pyromellitic acid anhydride | 2.4 | Benzyldimethylamine | 0.50 | 100 | 1 | 81 | 68 | 32 | |
| XX | 100 | Phthalic anhydride | 1.9 | Benzyldimethylamine | 0.50 | 100 | 1 | 51 | 31 | 10 | |
| YY | 100 | Phthalic anhydride | 2.6 | Benzyldimethylamine | 0.50 | 100 | 1 | 53 | 33 | 10 | |

*FC-520 is a 60% solution of an amine salt of trifluoromethanesulfonic acid in water.

That which is claimed is:

1. A composition comprising (A) a base resin consisting of an aqueous-alcoholic dispersion of (i) 5 to 75 weight percent, based on the total solids of (A), of colloidal silica,
(ii) 0 to 50 weight percent, based on the total solids of (A), of a partial condensate of a silanol which is selected from a group consisting of silanols having the formula
  (a) $RSi(OH)_3$ wherein R is methyl,
  (b) $R'Si(OH)_3$ wherein R' is a mixture of methyl with a radical selected from the group consisting of vinyl, phenyl, ethyl, propyl, 3,3,3-trifluoropropyl, gamma-methacryloxypropyl, gamma-mercaptopropyl and gamma-chloropropyl wherein the ratio of methyl radicals to the other radicals in the mixture is at least 1:1, and
  (c) $R''Si(OH)_3$ wherein R'' is selected from a group consisting of vinyl, phenyl, ethyl, propyl, 3,3,3-trifluoropropyl, gamma-methacryloxypropyl, gamma-mercaptopropyl and gamma-chloropropyl and mixtures thereof, wherein when (c) is selected, the amount of (c) in (A) cannot exceed 10 weight percent based on the total weight of (A);
(iii) 10 to 55 weight percent, based on the total solids of (A), of a partial condensate of a silanol of the formula $R''''Si(OH)_3$ wherein R'''' is selected from the group consisting of
(a)

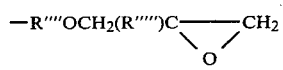

wherein R'''' is an alkylene radical containing 1 to 4 carbon atoms, R''''' is a hydrogen atom or an alkyl radical of 1 or 2 carbon atoms and
(b)

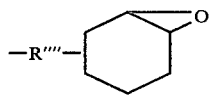

wherein R'''' has the meaning set forth above;
(B) a crosslinker for (A) and,
(C) a curing catalyst.

2. A composition as claimed in claim 1 wherein (A) (ii) is the partial condensate (a), $RSi(OH)_3$.

3. A composition as claimed in claim 1 wherein (A) (ii) is the partial condensate (b), $R'Si(OH)_3$.

4. A composition as claimed in claim 1 wherein (A) (ii) is the partial condensate (c), $R''Si(OH)_3$.

5. A composition as claimed in claim 3 wherein R' is a mixture of the methyl radical with the gamma-methacryloxypropyl radical.

6. A composition as claimed in claim 3 wherein R' is a mixture of the methyl radical with the phenyl radical.

7. A composition as claimed in claim 3 wherein R' is a mixture of the methyl radical with the propyl radical.

8. A composition as claimed in claim 3 wherein R' is a mixture of the methyl radical with the gamma-chloropropyl radical.

9. A composition as claimed in claim 3 wherein R' is a mixture of the methyl radical with the gamma-mercaptopropyl radical.

10. A composition as claimed in claim 3 wherein R' is a mixture of the methyl radical with the vinyl radical.

11. A composition as claimed in claim 4 wherein R'' is vinyl.

12. A composition as claimed in claim 4 wherein R'' is phenyl.

13. A composition as claimed in claim 4 wherein R'' is ethyl.

14. A composition as claimed in claim 4 wherein R'' is propyl.

15. A composition claimed in claim 4 wherein R'' is 3,3,3-trifluoropropyl.

16. A composition as claimed in claim 4 wherein R'' is gamma-methacryloxypropyl.

17. A composition as claimed in claim 4 wherein R'' is gamma-mercaptopropyl.

18. A composition as claimed in claim 4 wherein R'' is gamma-chloropropyl.

19. A composition as claimed in claim 1 wherein (A) (i) is present at 30 to 70 weight percent; (A) (ii) is present at 5 to 25 weight percent and (A) (iii) is present at 20 to 40 weight percent, all based on the total weight of (A).

20. A composition as claimed in claim 19 wherein there is also present sufficient component (B) to react with 25 to 200 percent of available epoxy groups in component (A) (iii) and 0.05 to 5 weight percent based on the total solids of (A), (B) and (C), of component (C).

21. A composition as claimed in claim 20 wherein component (B) is a polycarboxylic acid.

22. A composition as claimed in claim 20 wherein component (B) is a polycarboxylic anhydride.

23. A composition as claimed in claim 20 wherein component (B) is a polyfunctional imide.

24. A composition as claimed in claim 21 where the polycarboxylic acid is succinic.

25. A composition as claimed in claim 21 where the polycarboxylic acid is itaconic.

26. A composition as claimed in claim 21 where the polycarboxylic acid is fumaric.

27. A composition as claimed in claim 22 wherein the polycarboxylic anhydride is succinic anhydride.

28. A composition as claimed in claim 22 wherein the polycarboxylic anhydride is trimellitic anhydride.

29. A composition as claimed in claim 22 wherein the polycarboxylic anhydride is pyromellitic anhydride.

30. A composition as claimed in claim 22 wherein the polycarboxylic anhydride is phthalic anhydride.

31. A composition as claimed in claim 22 wherein the polycarboxylic anhydride is maleic anhydride.

32. A composition as claimed in claim 23 wherein the polyfunctional imide is succinimide.

33. A composition as claimed in claim 23 wherein the polyfunctional imide is phthalimide.

34. A composition as claimed in claim 23 wherein the polyfunctional imide is glutarimide.

35. A composition as claimed in claim 23 wherein the polyfunctional imide is maleimide.

36. A composition as claimed in claim 20 wherein component (C), the catalyst, is a metal acetyl acetonate.

37. A composition as claimed in claim 20 wherein component (C), the catalyst, is a diamide.

38. A composition as claimed in claim 20 wherein component (C), the catalyst, is an imidazole.

39. A composition as claimed in claim 20 wherein component (C), the catalyst, is an amine.

40. A composition as claimed in claim 20 wherein component (C), the catalyst, is an organic sulfonic acid.

41. A composition as claimed in claim 20 wherein component (C), the catalyst, is an amine salt of an organic sulfonic acid.

42. A composition as claimed in claim 20 wherein component (C), the catalyst, is an alkali metal salt of a carboxylic acid.

43. A composition as claimed in claim 36 wherein the metal acetyl acetonate is aluminum acetyl acetonate.

44. A composition as claimed in claim 36 wherein the metal acetyl acetonate is zinc acetyl acetonate.

45. A composition as claimed in claim 36 wherein the metal acetyl acetonate is cobalt acetyl acetonate.

46. A composition as claimed in claim 36 wherein the metal acetyl acetonate is iron acetyl acetonate.

47. A composition as claimed in claim 37 wherein the diamide is dicyandiamide.

48. A composition as claimed in claim 38 wherein the imidazole is 2-methylimidazole.

49. A composition as claimed in claim 39 wherein the amine is benzyldimethylamine.

50. A composition as claimed in claim 40 wherein the organic sulfonic acid is trifluoromethane sulfonic acid.

51. A composition as claimed in claim 42 wherein the alkali metal salt of a carboxylic acid is the sodium salt of acetic acid.

52. A composition of matter as claimed in claim 1 wherein there
(A) is (i) 5–75 weight percent of colloidal silica; (ii) 0–50 weight percent of $CH_3Si(OH_3)_3$ and (iii) 10–55 weight percent of

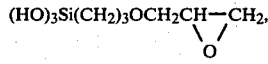

all based on the weight of (i), (ii), and (iii);
(B) sufficient succinimide to react with 25 to 200 percent of available epoxy groups in (A) (iii) and
(C) 0.05 to 5 weight percent, based on the total solids in the composition, of dicyandiamide.

53. A composition as claimed in claim 52 wherein there is present
(A)
(i) 50 weight percent, based on the total solids in (A), of colloidal silica,
(ii) 25 weight percent, based on the total solids in (A) of $CH_3Si(OH)_3$,
(iii) 25 weight percent, based on the total solids in (A), of

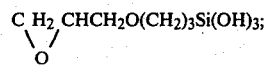

(B) sufficient succinimide to react with 85% of the available epoxy groups in (A) (iii) and,
(C) 1.5 weight percent, based on the weight of the total solids in the composition, of dicyandiamide.

54. A composition as claimed in claim 52 wherein there is present
(A) (i) 50 weight percent, based on the total solids in (A), of colloidal silica,
(B) sufficient itaconic acid to react with 85% of the available epoxy groups in (A) (iii) and,
(C) 5.0 weight percent, based on the weight of the total solids in the composition, of sodium acetate.

55. A process for coating solid substrates which comprises contacting a solid substrate with a composition of claim 1 and thereafter curing the composition on the solid substrate by heating the composition and substrate to a temperature of greater than 50° C.

56. A solid substrate prepared in accordance with claim 55.

57. A solid substrate prepared in accordance with claim 56 wherein said solid substrate is transparent.

58. A solid substrate in accordance with claim 57 wherein the solid substrate is an acrylic polymer.

59. A solid substrate in accordance with claim 57 wherein the solid substrate is a polyester.

60. A solid substrate in accordance with claim 59 wherein the polyester is poly(diphenylol propane) carbonate.

61. A solid substrate in accordance with claim 59 wherein the polyester is poly(diethylene glycol bis allyl) carbonate.

62. A solid substrate in accordance with claim 57 wherein the substrate is in the form of a lens.

63. A solid substrate in accordance with claim 62 wherein the lens is an ophthalmic lens.

* * * * *

UNITED STATES PATENT AND TRADEMARK OFFICE
CERTIFICATE OF CORRECTION

PATENT NO. : 4,355,135
DATED : October 19, 1982
INVENTOR(S) : James R. January

It is certified that error appears in the above-identified patent and that said Letters Patent is hereby corrected as shown below:

In column 2, line 30, "$R'Si(OH)_3$" should read -- $R''Si(OH)_3$ --.

In column 2, line 50, "1 to 2" should read -- 1 or 2 --.

In column 5, line 28, " $(CH_3O)_3SiCH_2CH_2$  "

should read -- $(CH_3O)_3SiCH_2CH_2$ 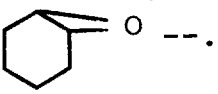 --.

In column 10, "Table II", under the "Component Z" column, "21.1" should read -- 21.2 --.

In column 17, line 41, "Examples were" should read -- Examples where --.

In column 20, line 5, "$OCH_2-C$" should read -- $OCH_2C$ --.

Signed and Sealed this

Twenty-seventh Day of November 1984

[SEAL]

Attest:

Attesting Officer

GERALD J. MOSSINGHOFF
Commissioner of Patents and Trademarks